(12) United States Patent
Spencer et al.

(10) Patent No.: US 8,291,627 B1
(45) Date of Patent: Oct. 23, 2012

(54) FRAME WITH MOVABLE EMBLEM

(75) Inventors: Todd Spencer, Colorado Springs, CO (US); Eldon Goates, Colorado Springs, CO (US)

(73) Assignee: Cruiser Accessories, LLC, Monument, CO (US)

( * ) Notice: Subject to any disclaimer, the term of this patent is extended or adjusted under 35 U.S.C. 154(b) by 0 days.

(21) Appl. No.: 12/932,086

(22) Filed: Feb. 17, 2011

(51) Int. Cl.
*G09F 7/00* (2006.01)
(52) U.S. Cl. ................................. 40/209; 40/210; 40/799
(58) Field of Classification Search .................... 40/209, 40/210, 798, 799
See application file for complete search history.

(56) References Cited

U.S. PATENT DOCUMENTS

| | | | | |
|---|---|---|---|---|
| 3,722,121 A | * | 3/1973 | Olczewski | 40/799 |
| 5,381,618 A | * | 1/1995 | Singleton | 40/202 |
| 6,347,472 B1 | * | 2/2002 | Dominguez | 40/729 |
| D593,917 S | | 6/2009 | Spencer et al. | |
| D602,831 S | | 10/2009 | Spencer et al. | |
| D602,832 S | | 10/2009 | Spencer et al. | |
| 2003/0079381 A1 | * | 5/2003 | Arens et al. | 40/210 |

* cited by examiner

*Primary Examiner* — Casandra Davis
(74) *Attorney, Agent, or Firm* — Linda Flewellen Gould (57) ABSTRACT

The present invention provides a frame for attaching a license plate or novelty plate to a vehicle, with the capability of attaching an emblem to the frame in a desired location chosen by the user from multiple possible points of attachment. Multiple receptacles may be formed in the frame, each suitable for receiving and tightly holding an protuberance extending from an emblem, so that the emblem may be attached to the frame wherever there is a receptacle. Alternatively, a separate clip may be placed behind the frame, with prongs extending forward around the frame to attach to an emblem in any position on the frame where the clip is located. The position of the emblem on the frame may be shifted up and down or side to side. The emblem may also be removed and repositioned in a new position selected by the user.

2 Claims, 13 Drawing Sheets

Figure 10
Section AA-AA / Detail D

Figure 9
Section AA-AA

FRAME WITH MOVABLE EMBLEM

BACKGROUND OF THE INVENTION

1. Field of the Invention

The present invention relates to a specialized frame which can connect a plate, such as a license plate, to a vehicle, while supporting one or more emblems which may be attached to the frame in multiple possible locations. In this manner, the user of the frame may easily position the emblem, choosing from multiple possible options for aesthetic preference or to meet legal requirements for the display of the license plate.

2. Description of the Prior Art

All fifty United States and many countries and provinces worldwide require government-issued license plates to be attached to the rear of motor vehicles operating within their borders. In addition, some states and countries require a license plate to be attached to the front of the vehicle as well. Because of these requirements, motor vehicle manufacturers typically provide a standard method and space for attaching such license plates to the vehicles. In jurisdictions where license plates are not required in the front, car owners often choose to attach a decorative plate, sometimes called a vanity plate or novelty plate, to the front of the vehicle in the space provided by the manufacturer of the vehicle for a license plate.

Vehicle owners often choose to decorate around the license plate or novelty plate with a stylized frame that surrounds the plate and adds aesthetic appeal. Such frames are typically rectangular in shape, with the frame surrounding an open area through which the plate can be viewed. The frame is frequently attached to the vehicle with screws or other connecting mechanisms which hold the license plate on the vehicle. License plate frames are available in a wide variety of designs. By way of example, U.S. Design Pat. D602,831 and D602,832 describe particular designs for license plate frames. A license plate frame sold by ChromaGraphics allows the user to select a two-dimensional ornament and place that ornament in one of several pre-determined locations on the frame with a permanent adhesive. Because of the nature of the adhesive mechanism, the ornament does not have the flexibility of extending beyond the license plate frame, and cannot be easily removed and re-positioned after it is initially stuck to the frame.

U.S. Design Pat. D593,917 describes a stylized frame with decorations related to the game of golf. The golf Design Patent '917 is an example of a frame which includes a three-dimensional emblem attached to a border of the frame, which emblem extends beyond the borders of the rectangular base frame. While frames with three-dimensional emblems have an aesthetic appeal, the emblems may present problems if a portion of the emblem extends beyond the space allowed on the vehicle for a license plate, possibly resulting in the emblem encountering a vehicle component, such as a part of a bumper, tail light, or body flair. Such stylized frames which fit some vehicles may not fit others, making it desirable that the frame itself have flexible components to fit various spaces.

Many government entities require that particular information on the license plate, such as the identity of the state issuing the plate, the number associated with that particular vehicle, or the tags that are often provided as proof of current registration, be viewable without being obscured by a frame. Depending on the particular license plate and regulations of the applicable government entity, the identifiers that cannot be obscured are in different places on different license plates. For frames with emblems that extend into or over portions of the license plate, problems may occur when the emblem obscures a portion of a license plate which is legally required to be visible. As a result, some license plate frames are acceptable for some vehicles and not for others, or meet legal requirements in some jurisdictions and not in others.

It is desirable to have a frame suitable for attaching a license plate to a vehicle, which frame can be customized by placing a two or three dimensional decoration or emblem on the frame in one of multiple possible positions. In this manner, the owner of the vehicle can select a position for the emblem which is aesthetically pleasing, permits the plate to be viewed without obscuring important information on the plate, and fits into the allowed space on the vehicle.

SUMMARY AND OBJECTS OF THE INVENTION

A primary object of the present invention is to provide a method of decorating a license plate frame for holding a plate on a vehicle which method allows a user to place an emblem or ornamental feature on the frame in a location chosen by the user from multiple possible places of attachment on the frame.

Another object of the present invention is to provide a frame for attaching a plate to a vehicle which frame can be easily customized by the user to support a two or three dimensional emblem chosen by the user in a location and orientation which is aesthetically pleasing to that user.

Yet another object of the present invention is to provide a frame which can be customized by the user to support an emblem in a location that does not obscure information presented on the plate held in place on the vehicle by the frame.

Yet another object of the present invention is to provide a frame on which a user can select a location for an emblem to avoid interference with adjacent components of the vehicle.

These objects are achieved by a device consisting of a frame, a connection means for connecting the frame to a vehicle so as to hold a license plate or novelty plate between the frame and the vehicle, one or more specialized emblems, and an attachment mechanism for connecting an emblem to the frame in a manner which allows the user to choose the location for the emblem. The attachment mechanism provides flexibility for positioning the emblem and allows the emblem to be removed from the frame and attached in a different position. Numerous attachment mechanisms are possible. For example, the attachment mechanism may consist of multiple receptacles located in various positions on the frame for receiving a protuberance extending from the emblem, multiple protuberances on the frame to be received by receptacles on an emblem, or a separate clip positioned on or around the frame suitable for releasably attaching to an emblem at the clip location.

The frame will typically be rectangular in shape, though other shapes are possible. The frame is attached to the vehicle and the plate by a connection mechanism which may be one of several known in the prior art for connecting two components together, typically involving a screw placed through a hole in the frame, a hole in the plate, and a hole in the vehicle in a place suitable for mounting a required license plate.

The emblem or emblems may be of a variety of designs, shapes and sizes, including but not limited to fanciful patterns, logos, or replicas of sports equipment, animals, or other objects. The user may select an emblem which appeals to that user. The emblem is then attached to the frame with one or more attachment mechanisms. Because of the flexibility of the attachment mechanism, the emblem may be attached to the frame in one of multiple possible positions. Depending on the specific configuration of the emblem, the emblem may be attached to the top, bottom, corner, left side, or right side of a rectangular frame. Matching or contrasting emblems may be selected and attached at different positions on the same frame. If the user decides that a different position would be advantageous, the emblem can be removed and re-positioned in a new location with respect to the frame or plate.

The frame may be designed such that it can be oriented right-side-up or up-side-down, allowing attachment points that were at the top to be relocated to the bottom or visa-versa. By allowing the emblem to attach in both orientations at a given attachment position, the user has more possible attachment possibilities with a minimum of structure for the attachment mechanism.

In one preferred embodiment, the attachment mechanism includes multiple receptacles in various positions on the frame, each of which receptacles can be matched with a protuberance extending from the face of the emblem which is not observable when the emblem is attached to the frame. Each receptacle may simply consist of a hole formed in the frame which hole is sized to allow a protuberance from an emblem to snugly fit within that opening. Alternatively, a receptacle may be an apparatus which can be removably attached to a protuberance extending backwards from the emblem, such as a barb, clasp, or hook. A receptacle may also consist of an indention or other hole formed in the frame, which can be matched to a protuberance, from the emblem, allowing a nut, screw, or similar apparatus to be inserted through the protuberance and receptacle to hold the emblem in place.

It may be useful to provide more than one protuberance on an emblem. In this way, the position in which the emblem is attached to the frame at a point where any particular receptacle exists may be shifted by matching different protuberances from the emblem to the selected receptacle. This may be particularly beneficial for larger emblems which may obscure required information on the license plate if placed in one position, but which provide a clear view of the license plate when shifted sideways, up, or down from a particular point of attachment on the frame.

In the drawings, the following legend has been used:

| | |
|---|---|
| 10 | Frame |
| 12 | Plate |
| 16 | Emblem |
| 17 | Emblem inserted between primary emblem and plate |
| 18 | Connection means for connecting the frame to the vehicle |
| 20 | Receptacle |
| 22 | Attachment mechanism |
| 24 | Protuberance from emblem |
| 26 | Top of Frame |
| 28 | Bottom of Frame |
| 30 | Right side of Frame |
| 32 | Left side of Frame |
| 34 | Front of Frame |
| 36 | Front face of emblem |
| 38 | Back face of emblem |
| 40 | Screw for holding protuberance in receptacle |
| 42 | Back of Frame |
| 44 | Clip attachable to frame |
| 46 | Prongs from Clip |
| 48 | Barb or clasp for catching protuberance |

DESCRIPTION OF THE PREFERRED EMBODIMENT

The present invention provides a frame for attaching a plate to a vehicle, with the unique feature of allowing one or more emblems to be removably attached to the frame in more than one possible position. In the following description, numerous specific details are set forth in order to provide a thorough understanding of the present invention. It will be obvious, however, to one skilled in the art that the present invention may be practiced with variations to or even without one or more of these specific details. Some well-known methods and structures have not been set forth in order not to unnecessarily obscure the description of the present invention.

Figure 1:
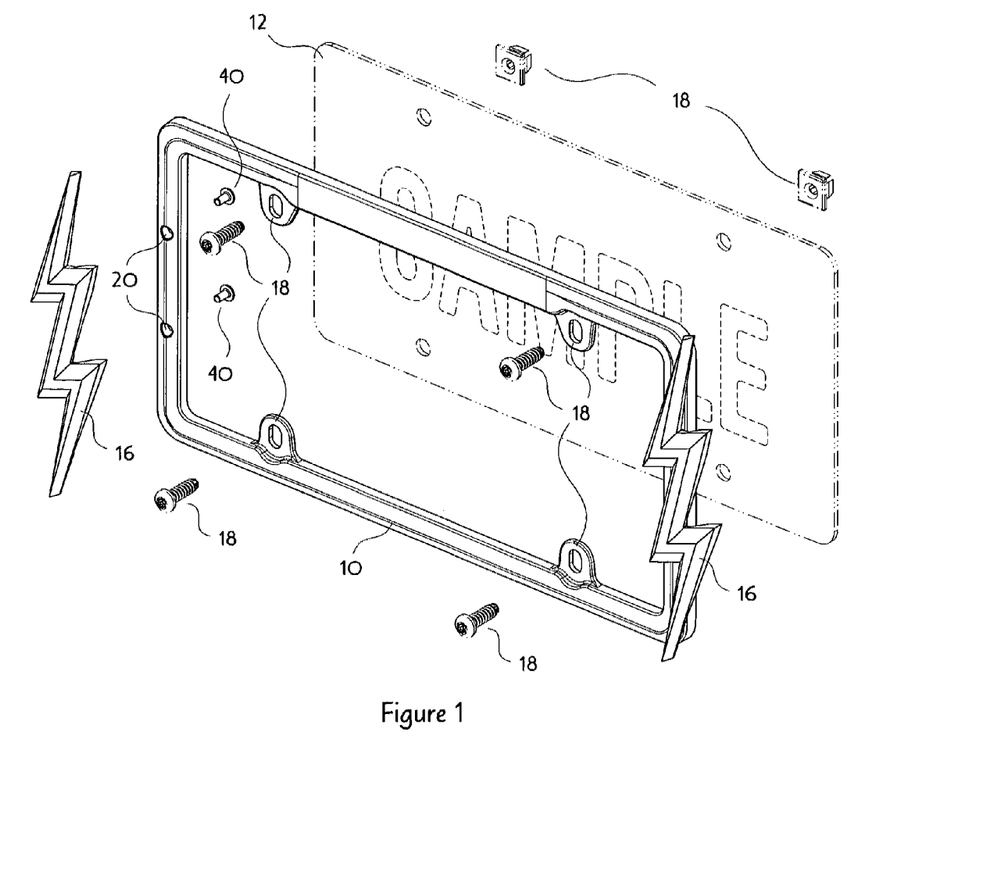
FIG. 1 is a front, partially exploded, perspective view of a frame with movable emblems, according to the present invention.

As shown in FIG. 1, a frame 10 may conveniently be used to attach a plate 12 to a vehicle (not shown). Numerous connection methods may be used to attach the frame and plate to the vehicle, including a conventional mechanism 18 involving a screw which is inserted in aligning holes in the frame 10, plate 12, and vehicle. That screw may be held in place by a nut tightened on the screw on the opposite side of the holes from the screw head or may snugly fit into a threaded receptacle in a mounting bracket or the body of the vehicle.

Figure 2:
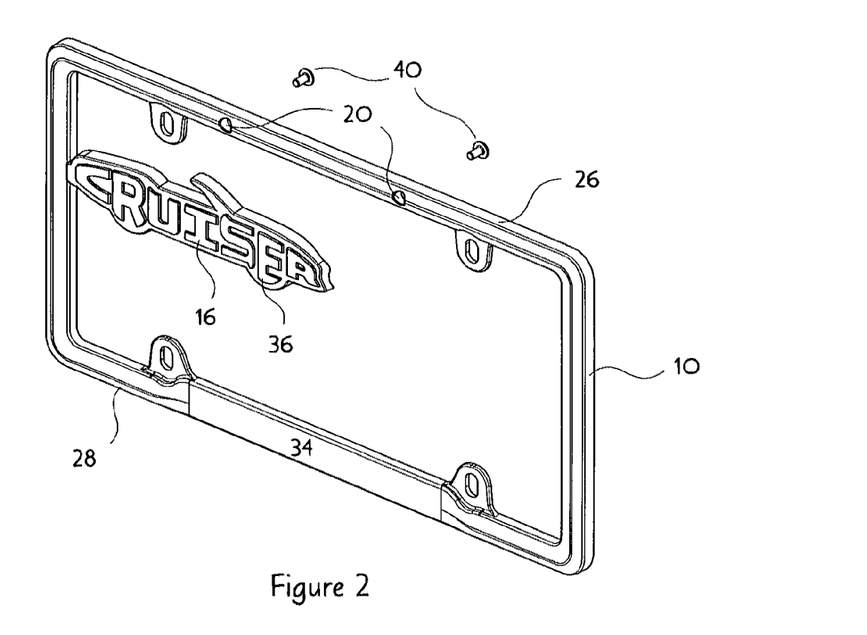
FIG. 2 is a front, exploded, perspective view of a frame with a movable emblem, according to the present invention.
Figure 3:
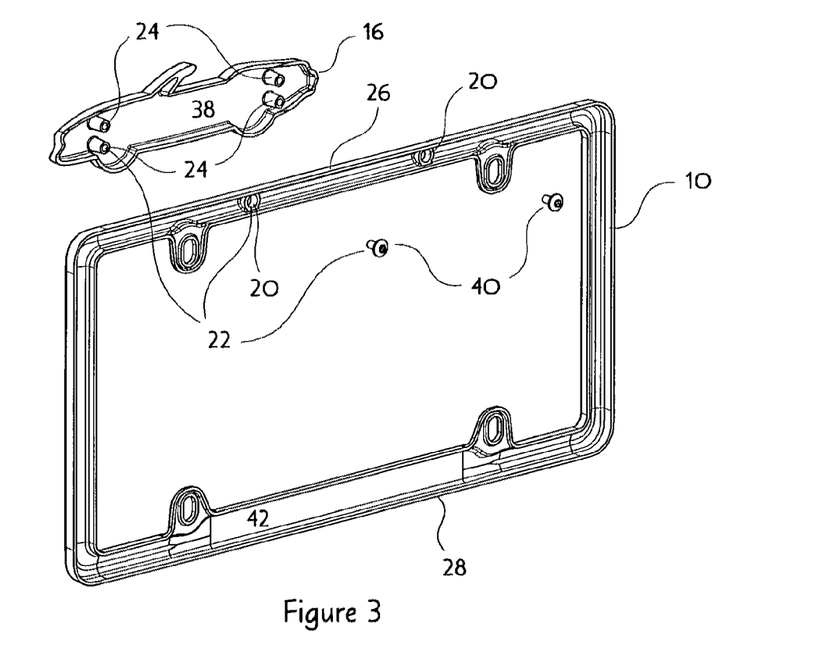
FIG. 3 is a back, exploded, perspective view of the frame and emblem of FIG. 2, according to the present invention.

One or more emblems 16 may be selected by the user to attach to the frame 10. Such emblems 16 may be of a variety of designs, shapes, and sizes, some examples of which are shown in the accompanying drawings. For example, FIGS. 2 and 3 show an emblem 16 of a car shaped logo bearing the word "CRUISER" which can be attached to the frame 10. The frame 10 is designed to accommodate placement of an emblem 16 in more than one position, so that the user can conveniently select a position which is aesthetically pleasing, allows information on the plate 12 to be viewed, and does not interfere with components of the vehicle (not shown) in the area in which the plate 12 is attached to the vehicle.

Figure 4:
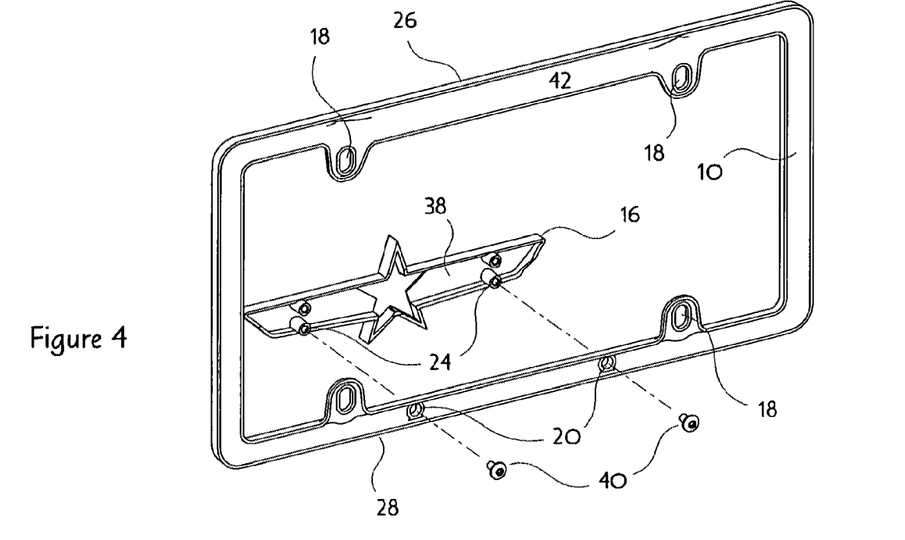
FIG. 4 is a back perspective view of a frame of the present invention, illustrating how an emblem is attachable in a position on the bottom of the frame.
Figure 5:
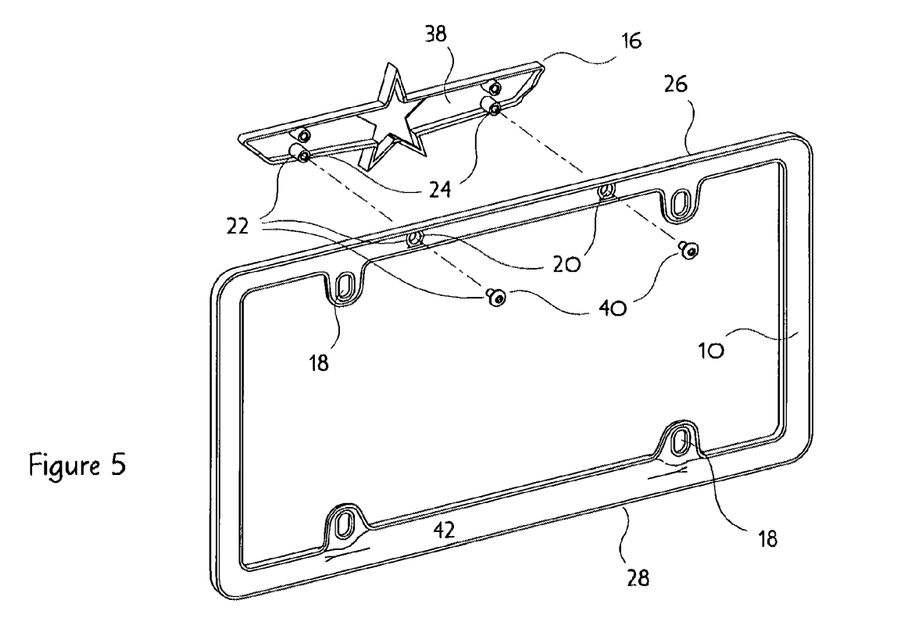
FIG. 5 is a back perspective view of the frame and emblem of FIG. 4, illustrating how the emblem is attachable in a position on the top of the frame by rotating the frame and translating the emblem.

For example, the emblem 16 shown in FIGS. 4 and 5 could be attached to the top 26 of the frame 10 as shown in FIG. 5 or to the bottom 28 of the same frame 10 as shown in FIG. 4, by utilizing the same receptacles 20 and simply turning the frame upside down to place the receptacles 20 in the desired location, at the top 26 of the frame 10 or bottom 28 of the frame 10. The emblem 16 attaches to the frame 10 at the same receptacles 20 in either orientation of the frame 10 without rotationally reorienting the emblem.

Figure 17:
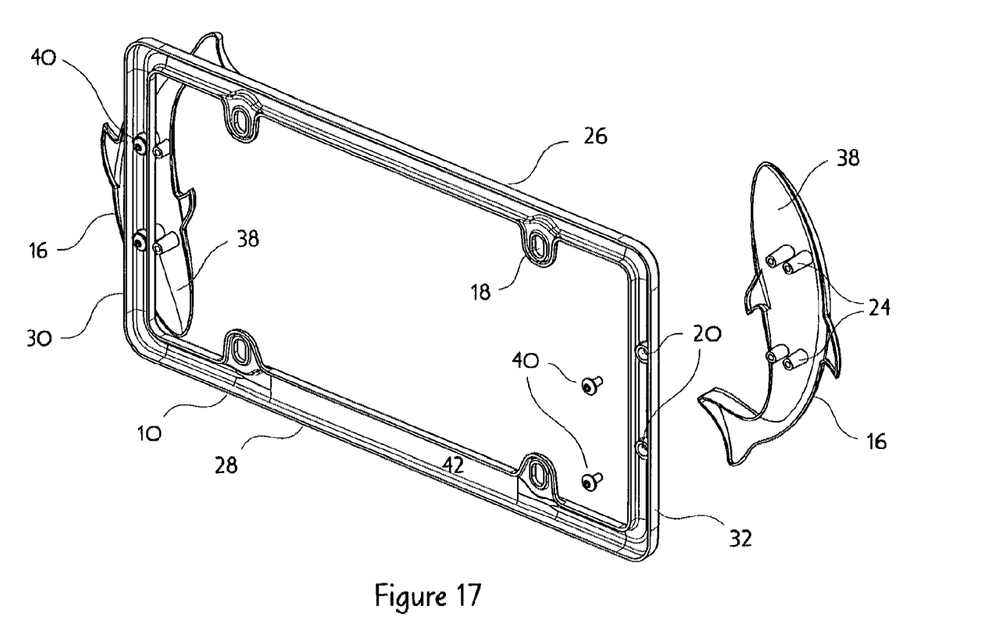
FIG. 17 is a back, partially exploded, perspective view of a frame of the present invention, illustrating how multiple emblems may be attached in multiple positions to opposing sides of the frame.

Numerous mechanisms 22 for attaching an emblem 16 to the frame 10 are possible. In a preferred embodiment, one or more protuberances 24 extending backwards and at a substantially right angle from the back face 38 of the emblem 16 may conveniently be matched with receptacles 20 on the frame 10 to attach the emblem 16 in a desired location. Some attachment mechanisms 22 involve inserting a protuberance 24 through a receptacle 20 formed in the frame 10, while other mechanisms 22 simply require the protuberance 24 and receptacle 20 to be aligned to receive a connecting pin or screw 40 inserted through the aligned protuberance 24 and receptacle 20. For relatively small emblems 16, a single protuberance 24 may be sufficient to attach the emblem 16 to the frame 10. As shown in FIGS. 20-23, one of several possible protuberances 24 extending from the back 38 of an emblem 16 may be matched with a single receptacle 20, to locate the emblem 16 in a selected position with respect to the frame 10. As shown in FIG. 17, an emblem 16 may be most securely fastened to the frame 10 by utilizing a set of multiple protuberances 24 which are designed to be inserted in or aligned with a matching set of receptacles 20 on the frame 10.

Figure 32:
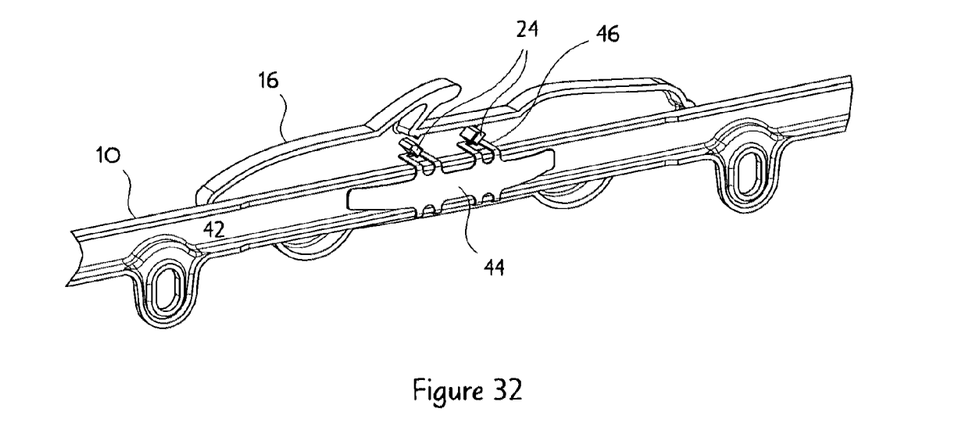
FIG. 32 is a back, perspective, partial view of a frame of the present invention, showing an alternate emblem attachment mechanism.
Figure 33:
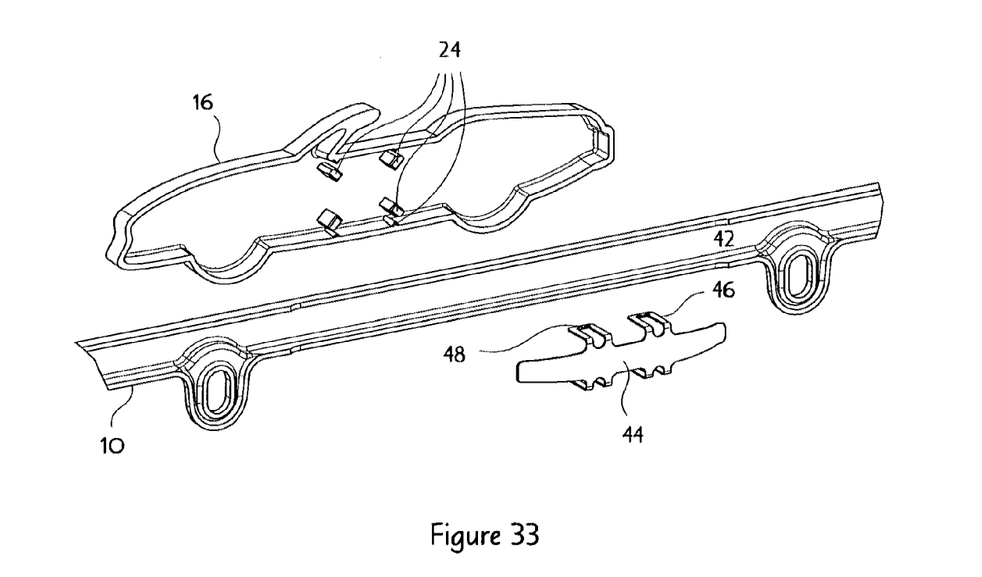
FIG. 33 is a back, perspective, partial, exploded view of the frame, emblem and attachment mechanism shown in FIG. 32.

In a distinct preferred embodiment shown in FIGS. 32 and 33, the attachment mechanism 22 may involve a separate clip 44 which is conveniently placed adjacent to the back 42 of the frame 10 in any location along the four sides 26, 28, 30, 32 of the rectangular frame 10. The clip 44 has prongs 46 which extend forward around the frame 10, each of which prongs 46 bears a barb or other clasping apparatus 48. Thus, when the clip 44 is placed adjacent to the back 42 of the frame 10 with prongs 46 extending forward around the frame 10, one or more protuberances 24 from an emblem 16 may be placed adjacent to the clip prongs 46, where they are held in place by the barbs 48. In this manner, the emblem 16 may be placed virtually anywhere along the frame 10, as the clip 44 may be mounted on the frame 10 in an unlimited number of locations. Once the emblem 16 is held in place by the clip 44, the clip 44 and emblem 16 combination are removably but securely held in the selected position by the attachment of the protuberance 24 to the clip 44 with the frame 10 clamped between the clip 44 and emblem 16. It is possible to provide one or more receptacles 20 on the prongs 46 of a clip 44, so that protuberances 24 extending from an emblem 16 may be inserted into or held against those receptacles 20. The reverse is also true. The attachment mechanism 22 may consist of receptacles 20 on the back face 38 of the emblem 16, which are matched with protuberances 24 extending from a clip 44. Similarly, the attachment mechanism 22 may consist of receptacles 20 on the back face 38 of the emblem 16 which are matched with protuberances 24 extending from the frame 10. The attachment mechanism 22 may even consist of a receptacle 20 on the emblem 16 and receptacles 20 on the frame 10, so that the receptacle 20 on the emblem 16 may be matched with a selected receptacle 20 on the frame 10, with a screw or other fastener 40 inserted through the matching receptacles 20 to hold the emblem 16 to the frame 10 at a chosen position.

Figure 6:
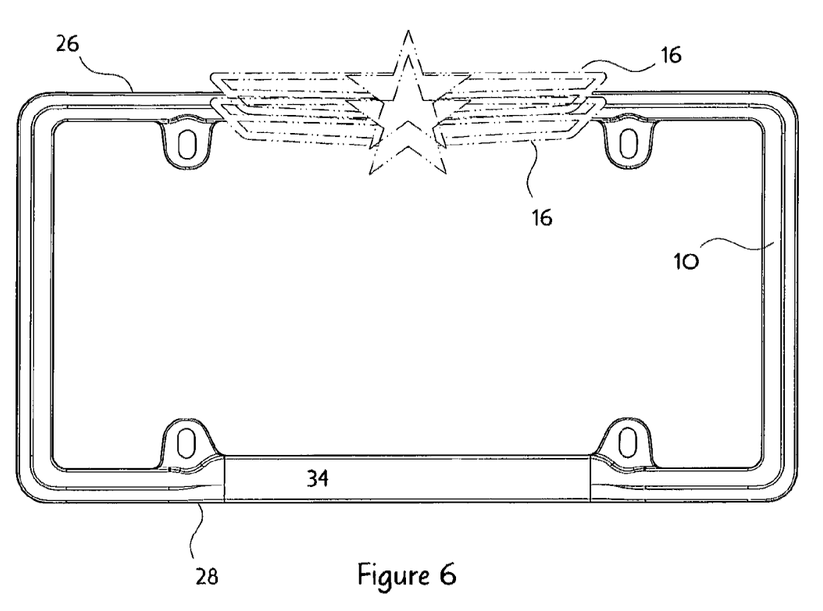
FIG. 6 is a front view of the frame and emblem of FIG. 5, illustrating how the emblem may be attached in one of two different positions on the top of the frame.
Figure 7:
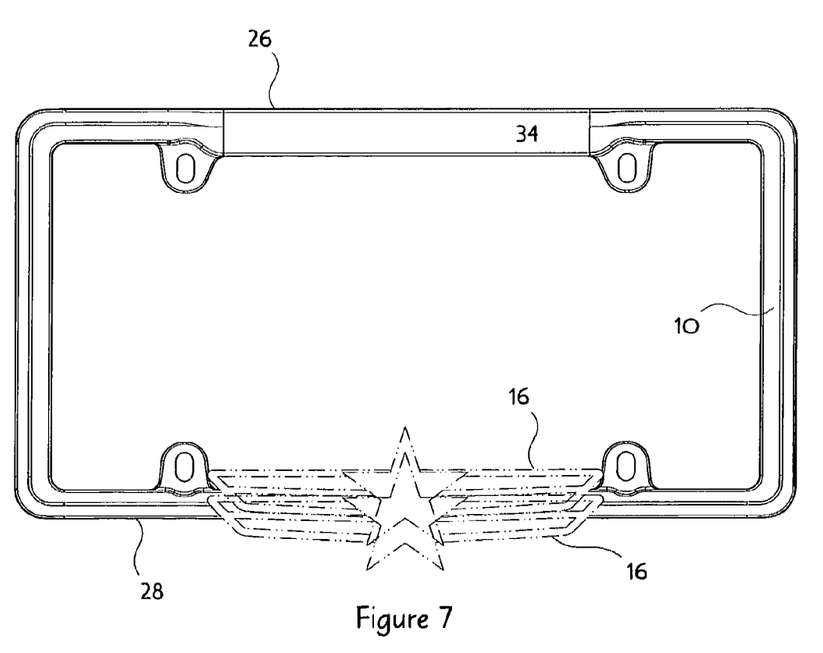
FIG. 7 is a front view of the frame and emblem of FIG. 4, illustrating how the emblem may be attached in one of two different positions on the bottom of the frame.
Figure 8:
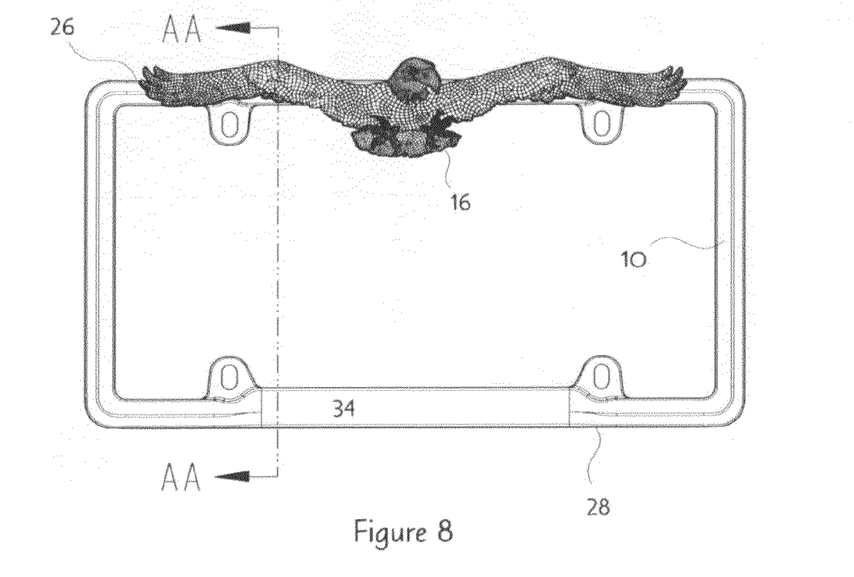
FIG. 8 is a front view of a frame of the present invention, showing an eagle emblem attached to the top of the frame.
Figure 9:
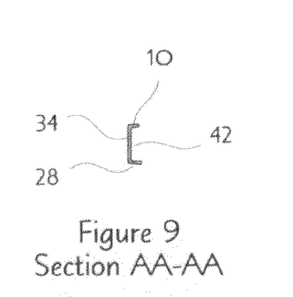
FIG. 9 is a side section view of the frame shown in FIG. 8.

As shown in FIGS. 4 and 5, multiple protuberances or sets of protuberances 24 extending from the same emblem 16 may be utilized to allow that emblem 16 to be positioned in more than one location while using the same receptacle or set of receptacles 20 on the frame 10. In this manner, an emblem 16 may be attached to the frame 10 in more than one position, as shown in FIGS. 6 and 7, while using the same set of receptacles 20 for attachment. Multiple protuberances or sets of protuberances 24 enable the user to shift the position of the emblem 16 up and down or from side to side by simply matching a different protuberance or set of protuberances 24 to the receptacle or set of receptacles 20 in the desired location on the frame 10. Conversely, a single protuberance or set of protuberances 24 may be utilized to shift the position of the emblem 16 by matching that protuberance or set of protuberances 24 to one of multiple possible receptacles or sets of receptacles 20 in a desired location on the frame 10.

Figure 10:
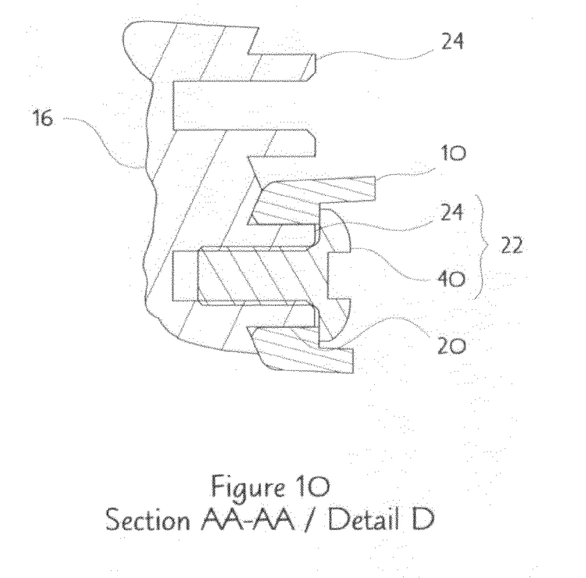
FIG. 10 is an enlarged, partial view of the section view of the attachment mechanism shown in FIG. 9.

A particular attachment mechanism 22 is illustrated in the detailed section view of FIG. 10. A threaded fastener or screw 40 threads into a hollow protuberance 24 such that the outer edge of the head of screw 40 rests on the raised back side of a receptacle 20. Tightening of the screw 40 pulls the emblem 16 snug to the frame 10 for a secure, yet removable attachment. This particular attachment mechanism 22 utilizes the hollow protuberance 24 as a location pin as well as an attachment point. Having the head of screw 40 larger than the diameter of protuberance 24 and the respective receptacle 20 allows maximum thread engagement in protuberance 24 to minimize the length of screw 40 and to minimize the corresponding height or thickness required for emblems 16. A variety of attachment mechanisms 22 are possible.

Also in FIG. 10, a second protuberance 24 is shown above the connection with the screw 40. By removing the screw 40 and then the emblem 16, the second protuberance 24 could be inserted into the receptacle 20 and the screw 40 reinserted. This action would move the emblem 16 down with respect to the frame 10, changing the overall appearance and also changing the portions of the plate 12 that are obscured by the emblem 16.

Figure 11:
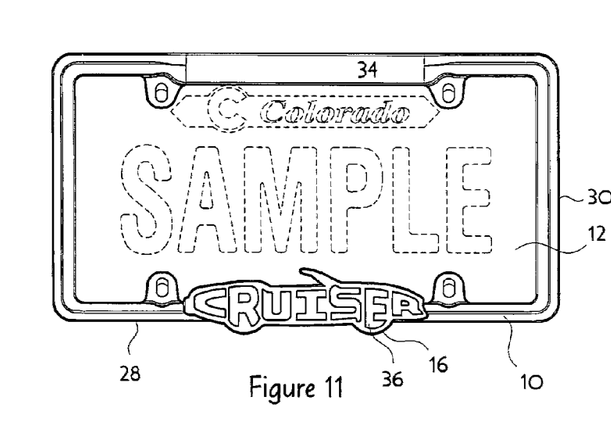
FIG. 11 is a front view of a frame of the present invention, showing an emblem attached to the bottom of the frame.
Figure 12:
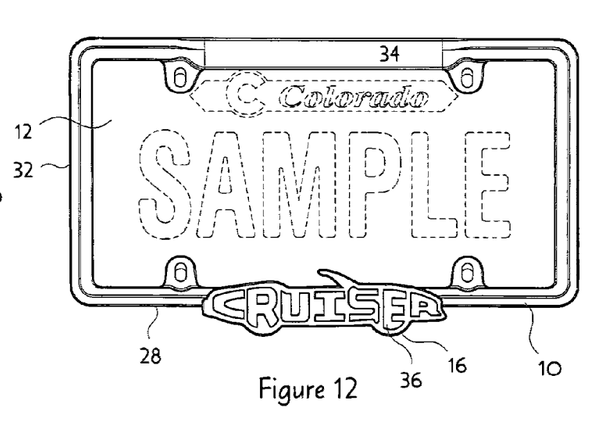
FIG. 12 is a front view of the frame and emblem of FIG. 11, showing the emblem attached to the bottom of the frame in a different position than shown in FIG. 11.
Figure 13:
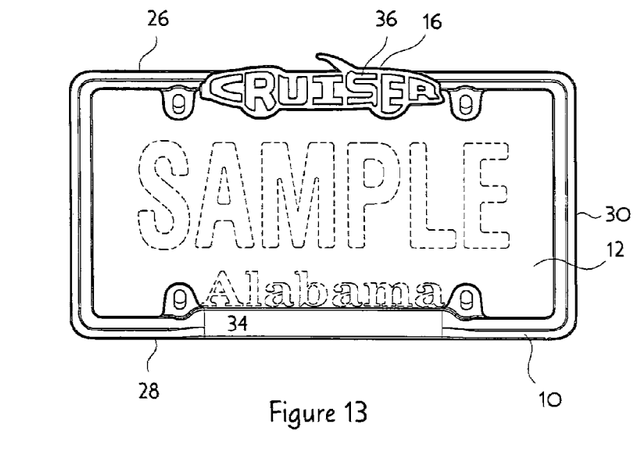
FIG. 13 is a front view of the frame and emblem of FIG. 11, showing the frame in a position rotated 180 degrees (top to bottom) from the position shown in FIG. 11, and the emblem translated vertically and attached at the top of the rotated frame.
Figure 14:
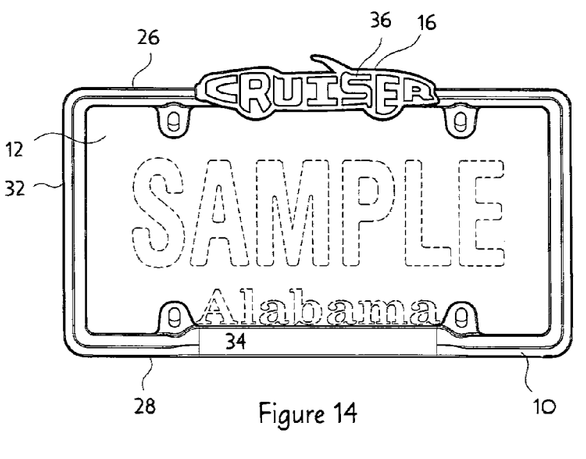
FIG. 14 is a front view of the frame and emblem of FIG. 11 reoriented as in FIG. 13, showing the emblem attached to the top of the frame in a different position than shown in FIG. 13.

Utilizing different locations on the frame 10 for placement of the emblem 16 may be critically important to allow specific information on the plate 12 to be visible as required by government regulations. For example, in states in which the identity of the state is located toward the top of a license plate 12, as shown in FIGS. 11 and 12, it is advisable to locate an emblem 16 at the bottom 28 of the frame 10, to avoid obscuring the name of the state on the plate 12. However, if the state identifying information is toward the bottom of the plate 12, an emblem location on the top 26 of the frame 10 may be advantageous, as shown in FIGS. 13 and 14. If multiple sets of protuberances 24 extend from the back 38 of the emblem 16, different positions of the emblem 16 for a given orientation of the plate 12 are possible. As illustrated in FIGS. 11 and 12 and FIGS. 13 and 14, even though placement of the emblem 16 in particular receptacles 20 may be dictated by the legal requirement to not obscure a particular portion of the license plate 12, multiple positions are still possible and may be chosen based on aesthetic preference or by situational fit requirements for the particular vehicle.

Figure 15:
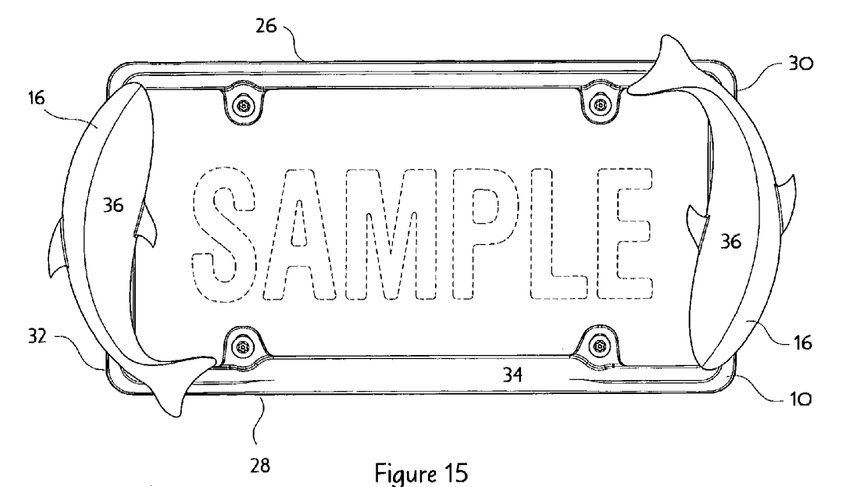
FIG. 15 is a front view of a frame of the present invention, showing two emblems attached to opposite sides of the frame.
Figure 16:
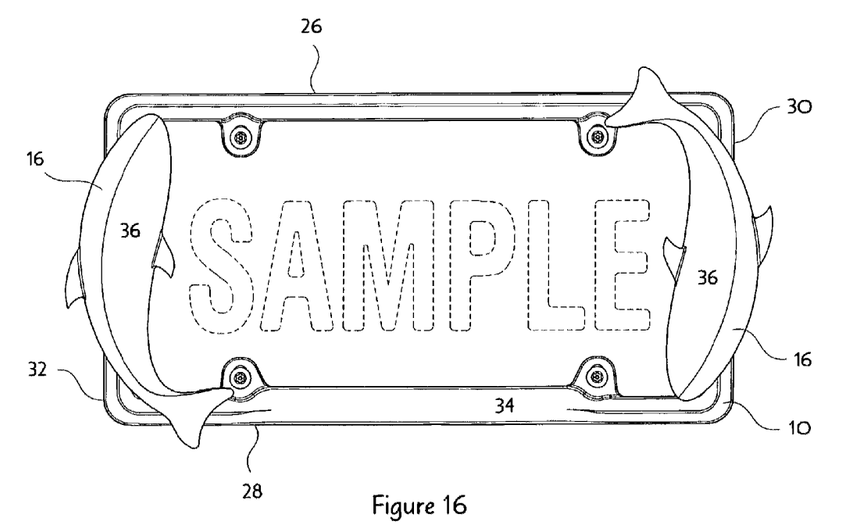
FIG. 16 is a front view of the frame and emblem of FIG. 15, showing the two emblems attached to opposite sides of the frame in different positions than shown in FIG. 15.

Similarly, a user may prefer to place one or more emblems 16 on the right side 30 and/or left side 32 of the frame 10, as shown in FIGS. 15 and 16. As best illustrated in FIG. 17, having multiple protuberances or sets of protuberances 24 extending from the back side 38 of the emblem 16 allow the emblems 16 to be shifted from one position to another while located on the sides 30, 32 of the frame 10. These options also allow choices based on aesthetic preference, situational fit requirements for the vehicle, and visibility requirements for government issued tags or plate features.

Figure 18:
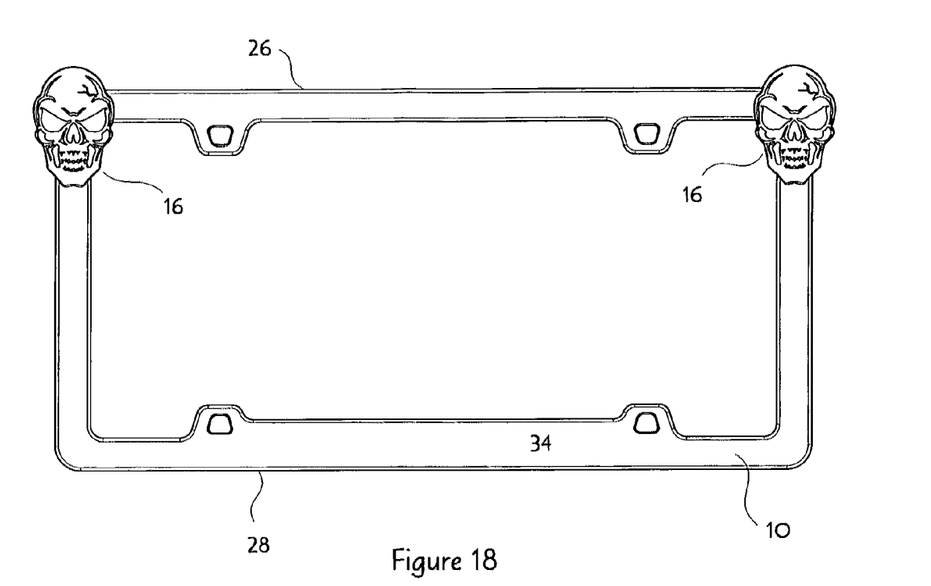
FIG. 18 is a front view of a frame of the present invention, showing two emblems, each emblem attached to a top corner of the frame.
Figure 19:
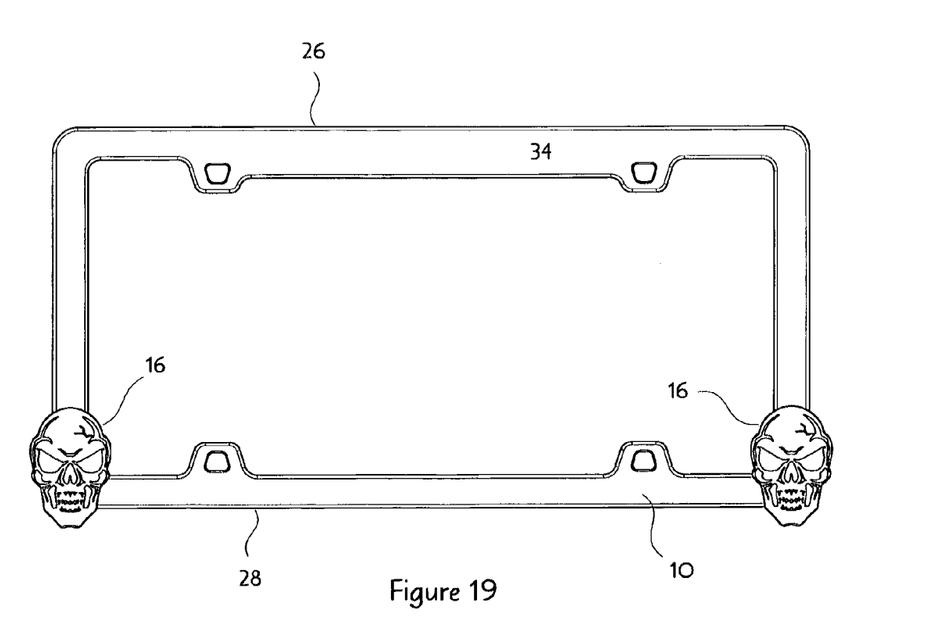
FIG. 19 is a front view of the frame and two emblems of FIG. 18, the frame having been rotated 180 degrees (top to bottom), and the emblems being translated vertically, so that each emblem is located in a bottom corner of the frame.
Figure 20:
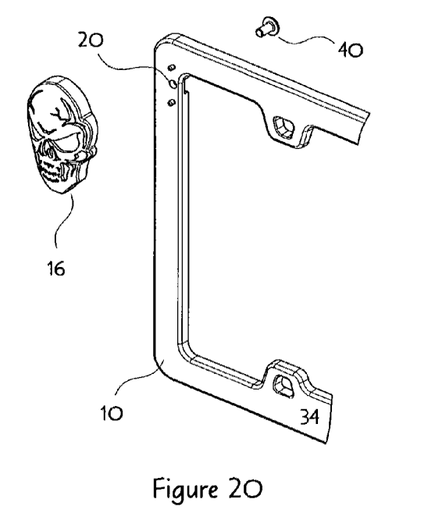
FIG. 20 is a front, perspective, exploded, partial view of a frame of the present invention, illustrating how an emblem may be attached in a position on a corner of the frame.
Figure 21:
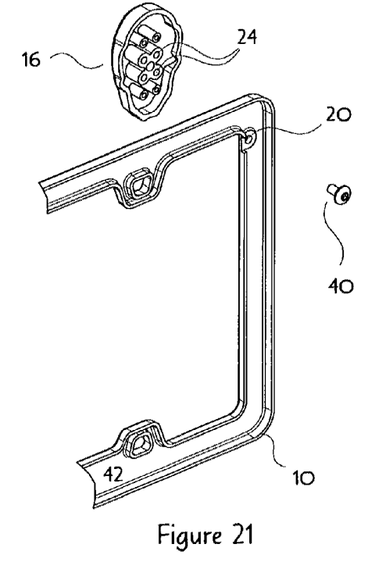
FIG. 21 is a back, perspective, exploded, partial view of the frame and emblem shown in FIG. 20.
Figure 22:
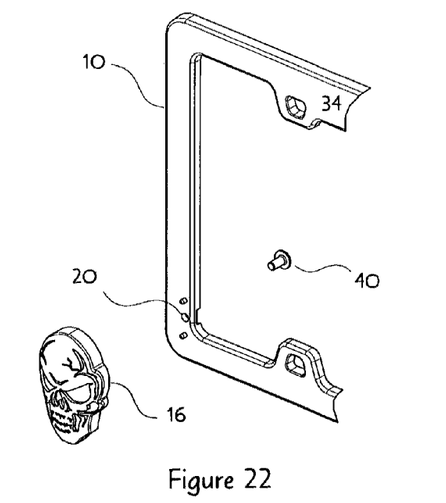
FIG. 22 is a front, perspective, exploded, partial view of the frame and emblem shown in FIG. 20, the frame having been rotated so that an emblem may be attached to the corner but at a different position of the frame relative to the plate than shown in FIG. 20.
Figure 23:
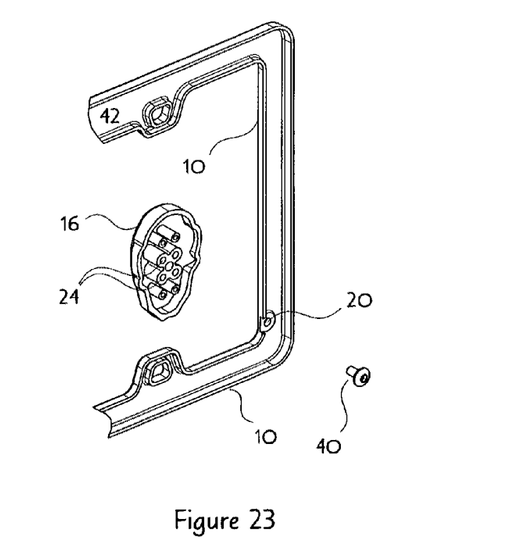
FIG. 23 is a back, perspective, exploded, partial view of the frame and emblem shown in FIG. 22.
Figure 24:
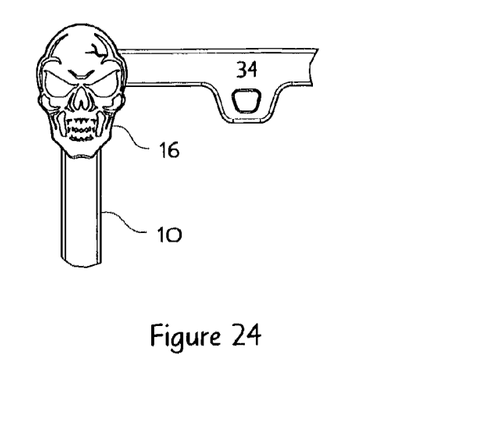
FIG. 24 is a front, partial view of a frame of the present invention with a skull emblem attached in the top left corner of the frame.
Figure 25:
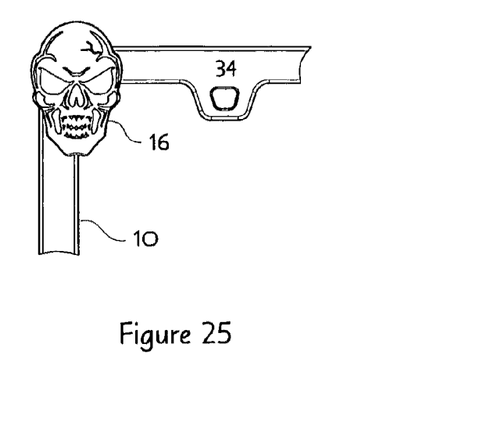
FIG. 25 is a front, partial view of the frame and emblem of FIG. 24, the skull emblem attached in the top left corner of the frame in a different position than shown in FIG. 24.
Figure 26:
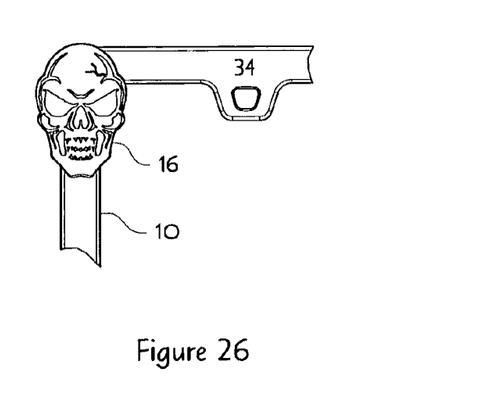
FIG. 26 is a front, partial view of the frame and emblem of FIG. 24, the skull emblem attached in the top left corner of the frame in a different position than shown in FIGS. 24 and 25.
Figure 27:
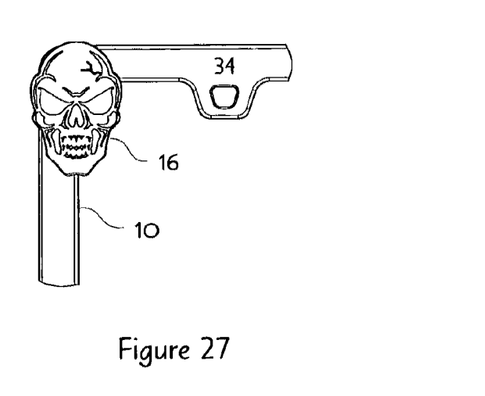
FIG. 27 is a front, partial view of the frame and emblem of FIG. 24, the skull emblem attached in the top left corner of the frame in a different position than shown in FIGS. 24, 25, and 26.

As best shown in FIGS. 18 and 19, emblems 16 may be removably attached to the frame 10 in corner positions. Indeed, each emblem 16 may be situated in the same corner in multiple positions such as a left upper position as shown in FIG. 24, a right upper position as shown in FIG. 25, a left lower position as shown in FIG. 26, or a right lower position as shown in FIG. 27. By aligning a protuberance 24 with one of multiple receptacles 20 formed in a corner or other area of the frame 10, the position of the emblem 16 within that corner or other area may be shifted from the position achieved utilizing a different receptacle 20.

As best demonstrated by FIGS. 28, 29, 30, and 31, multiple emblems 16, 17 may be stacked on top of each other. This may be accomplished by including receptacles 20 in the back emblem 17 of two stacked emblems 16, 17, to allow one or more protuberances 24 extending from the front emblem 16 to be matched with the receptacles 20 in the back emblem 17 as well as aligned with receptacles 20 in the frame 10. A single screw or other fastener 40 may conveniently be inserted from the back 42 of the frame 10 through an aligned hollow protuberance 24 and receptacles 20 to secure the attachment of emblems 16, 17. Other attachment methods are possible.

Figure 28:
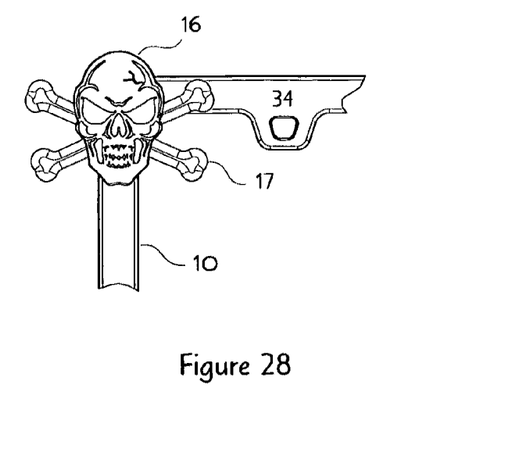
FIG. 28 is a front, partial view of a frame of the present invention, with a skull emblem and a cross-bones emblem both attached in the top left corner of the frame.
Figure 29:
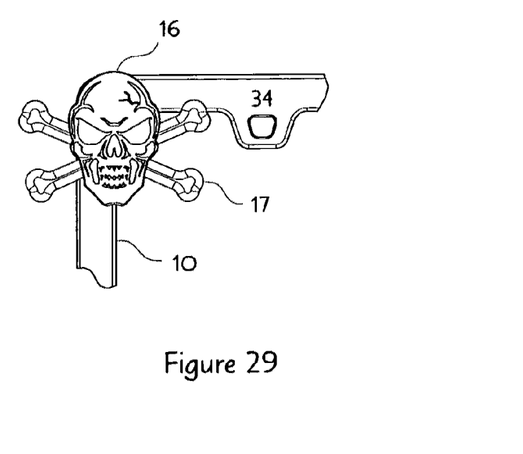
FIG. 29 is a front, partial view of the frame and emblems of FIG. 28, with the skull emblem and a cross-bones emblem both attached in the top left corner of the frame, in a different position than shown in FIG. 28.
Figure 30:
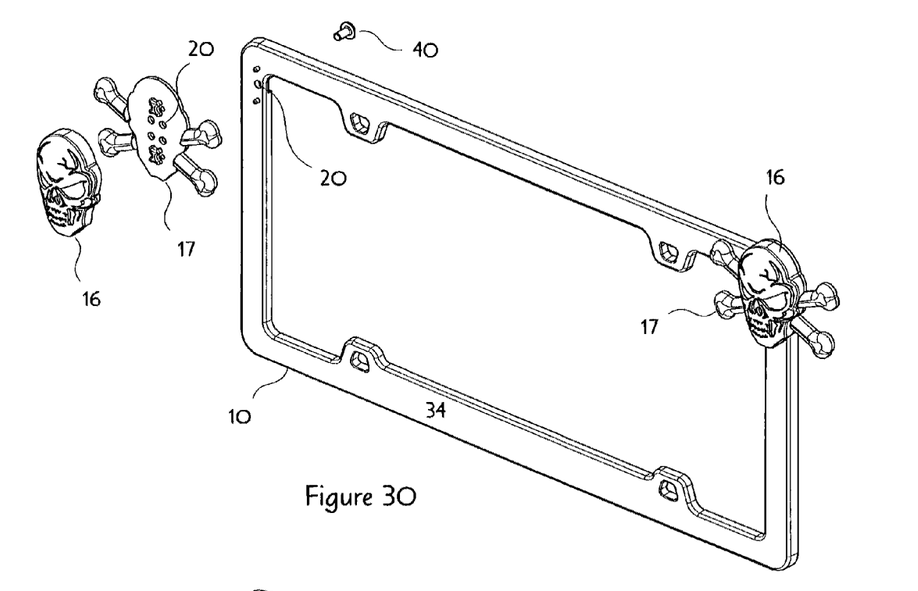
FIG. 30 is a front, perspective, partially exploded view of a frame of the present invention, illustrating how a skull emblem and a cross-bones emblem may both be attached to the frame, one over the other.
Figure 31:
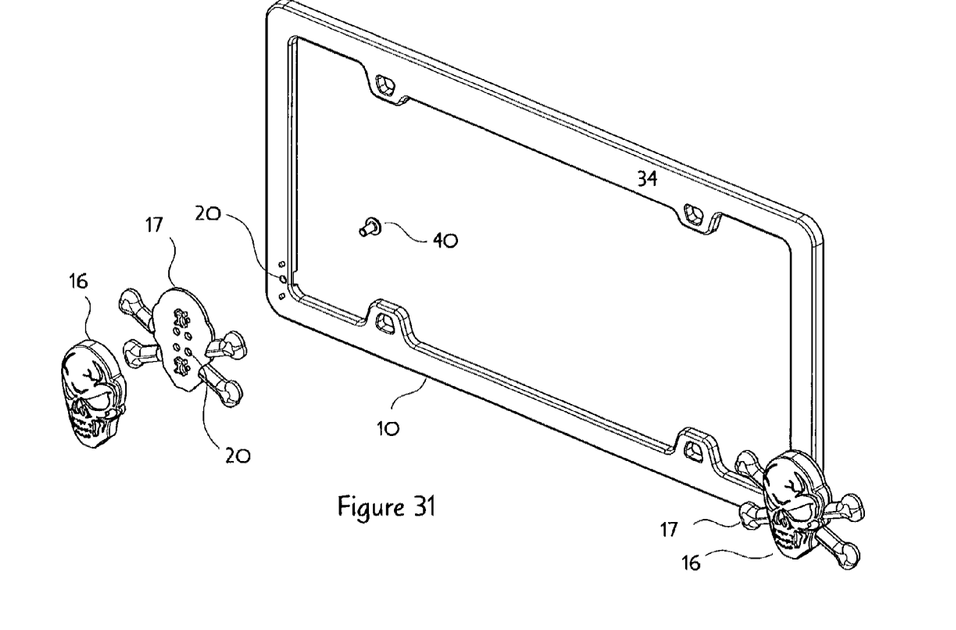
FIG. 31 is a front, perspective, partially exploded view of the frame and emblems shown in FIG. 30, the orientation of the frame having been changed so that dual emblems may be attached in a different position on the frame relative to the plate.

The stackable emblems 16, 17 allow additional options for the user. As shown in FIG. 28 contrasted with FIG. 24, including the back emblem 17 can require more available space. Whether the back emblem 17 may be displayed may depend on the available space on the vehicle and whether particular areas of the plate 12 are legally required to be visible. Positional changes are still available as seen in FIGS. 28 and 29, though the overall size of the emblem 16 and 17 is greater because of the addition of the emblem 17. If space is not available, or if aesthetic desires dictate, the front emblem 16 may be attached without the back emblem 17. The ability to remove the back emblem 17 while still displaying the front emblem 16 to accommodate specific needs for space or appearance is unique to this frame 10.

Although the present invention has been described in terms of the presently preferred embodiments, it is to be understood that such disclosure is purely illustrative and is not to be interpreted as limiting. Consequently, without departing from the spirit and scope of the invention, various alterations, modifications, or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

We claim:

1. A device for holding a plate on a vehicle, comprising:
   a. a frame,
   b. connection means for connecting the frame to the vehicle in a manner that holds the plate between said frame and the vehicle,
   c. an emblem, and
   d. attachment means for attaching said emblem to said frame at a first desired attachment location chosen from multiple possible attachment locations on the frame, said attachment means allowing said emblem to be repositioned and attached at a second desired attachment location chosen from said multiple possible attachment locations,
   e. wherein said attachment means also allows said emblem to be attached in one of multiple possible positions with respect to the frame at each of said multiple possible attachment locations, and
   f. said attachment means further comprising a separate clip positioned adjacent to said frame, said clip having a plurality of prongs extending around said frame, each prong having a receptacle suitable for matching with a protuberance extending from said emblem, said clip being located at the desired attachment location.

2. A device for holding a plate on a vehicle, comprising:

a. a frame, b. connection means for connecting the frame to the vehicle in a manner that holds the plate between said frame and the vehicle, c. an emblem, and d. attachment means for attaching said emblem to said frame at a first desired attachment location chosen from multiple possible attachment locations on the frame, said attachment means allowing said emblem to be repositioned and attached at a second desired attachment location chosen from said multiple possible attachment locations, e. wherein said attachment means also allows said emblem to be attached in one of multiple possible positions with respect to the frame at each of said multiple possible attachment locations, f. wherein said emblem has a plurality of protuberances extending from said emblem and each attachment location has at least one receptacle suitable for matching with one of said protuberances, so that said emblem is attachable to the frame in a chosen attachment location by matching a first protuberance to a selected receptacle, and is attachable to the frame in a different position at said chosen attachment location by matching a second protuberance to said selected receptacle, g. further comprising a second emblem having at least one emblem receptacle suitable for receiving said protuberance when said protuberance is inserted through said emblem receptacle and through a receptacle in the chosen attachment location on the frame.

\* \* \* \* \*